US012486967B2

(12) United States Patent
Chavan et al.

(10) Patent No.: US 12,486,967 B2
(45) Date of Patent: Dec. 2, 2025

(54) LIGHT-EMITTING DIODE (LED) LUMINAIRE ASSEMBLY AND METHODS

(71) Applicant: Eaton Intelligent Power Limited, Dublin (IE)

(72) Inventors: Poonam Chavan, Satara (IN); Ajay Chidambaram Pillai Swornalatha, Kanyakumari District (IN); Ravi Shankar Panday, Lucknow (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/365,884

(22) Filed: Aug. 4, 2023

(65) Prior Publication Data

US 2023/0375161 A1 Nov. 23, 2023

Related U.S. Application Data

(63) Continuation of application No. 17/499,191, filed on Oct. 12, 2021, now Pat. No. 11,774,070.

(60) Provisional application No. 63/090,393, filed on Oct. 12, 2020.

(51) Int. Cl.

| | |
|---|---|
| ***F21V 15/01*** | (2006.01) |
| ***F21V 3/06*** | (2018.01) |
| ***F21V 29/83*** | (2015.01) |
| ***F21Y 115/10*** | (2016.01) |

(52) U.S. Cl.

CPC .............. *F21V 15/01* (2013.01); *F21V 3/061* (2018.02); *F21V 29/83* (2015.01); *F21Y 2115/10* (2016.08)

(58) Field of Classification Search

CPC .......... F21V 15/01; F21V 3/061; F21V 29/83; F21V 23/003; F21V 23/009; F21V 29/10; F21V 29/777; F21V 25/12; F21V 19/001; F21V 29/77; F21Y 2115/10; F21S 2/00

See application file for complete search history.

(56) References Cited

U.S. PATENT DOCUMENTS

| | | | | |
|---|---|---|---|---|
| 8,199,502 | B2 * | 6/2012 | Ji | G06F 1/20 361/703 |
| 8,419,240 | B2 * | 4/2013 | Lim | F21V 29/773 362/249.02 |
| 8,545,064 | B2 * | 10/2013 | Blincoe | F21V 29/767 362/373 |
| 9,714,762 | B2 * | 7/2017 | Wu | F21V 5/04 |
| 10,634,285 | B1 * | 4/2020 | Kelly | F21V 29/503 |

(Continued)

FOREIGN PATENT DOCUMENTS

| | | |
|---|---|---|
| CN | 201443739 U | 4/2010 |
| CN | 104279461 A | 1/2015 |

(Continued)

*Primary Examiner* — Tsion Tumebo

(74) *Attorney, Agent, or Firm* — Baker Botts L.L.P.

(57) ABSTRACT

A light-emitting diode (LED) luminaire assembly includes a mounting module having a cavity. The luminaire assembly also includes an LED assembly coupled to the mounting module at an end of the cavity, and a driver mounted on a driver plate and configured to provide electricity to the LED assembly, the driver plate coupled to the mounting module. The luminaire assembly further includes one or more reduced thickness sections provided on a series path of thermal conduction between the LED assembly and the mounting module, to facilitate decreased conductive heat transfer therebetween.

20 Claims, 9 Drawing Sheets

(56) References Cited

U.S. PATENT DOCUMENTS

| | | | | |
|---|---|---|---|---|
| 2009/0141508 A1* | 6/2009 | Peng | F21V 29/74 | 362/373 |
| 2011/0194280 A1* | 8/2011 | Ruffin, Jr. | F21K 9/23 | 362/249.02 |
| 2013/0223061 A1* | 8/2013 | Hwu | F21V 29/74 | 362/294 |
| 2017/0307204 A1* | 10/2017 | Cattoni | F21V 29/89 | |

FOREIGN PATENT DOCUMENTS

| | | | |
|---|---|---|---|
| CN | 109983277 | A | 7/2019 |
| EP | 2868965 | A1 | 5/2015 |

* cited by examiner

LIGHT-EMITTING DIODE (LED) LUMINAIRE ASSEMBLY AND METHODS

PRIORITY

This application is a continuation under 35 U.S.C. § 120 of U.S. patent application Ser. No. 17/499,191 filed Oct. 12, 2021, which claims the benefit under 35 U.S.C. § 119(e) of U.S. Provisional Patent Application Ser. No. 63/090,393, filed on Oct. 12, 2020, the disclosures of which is hereby incorporated by reference in their entirety.

BACKGROUND OF THE DISCLOSURE

The field of the disclosure relates generally to high lumen luminaire assemblies, and more particularly to assemblies and methods for high lumen light-emitting diode (LED) luminaire assemblies located in a harsh and/or hazardous environment.

To address the shortcomings of incandescent bulbs in traditional lighting figures, more energy-efficient and longer lasting sources of illumination in the form of LEDs are highly desired. This includes, but is not limited to lighting fixtures that are specially designed for use in harsh and/or hazardous environments that require a specific focus on heat management in the operation of the lighting fixtures. Such lighting fixtures may include many high output LEDs operating in combination, and can produce excessively high temperatures for hazardous location usage. In a hazardous location, the peak operating temperature of the lighting fixture must be managed so as not to exceed a predetermined temperature limit that could cause the light fixture to be a source of ignition of combustible elements in the ambient environment. In addition, in hazardous or harsh industrial environments, such as mines, refineries, and petroleum chemical plants, gas, vapors, dust, or other corrosive substances are present in the ambient environment. In such environments, luminaire assemblies are subject to corrosion, especially around joints and connections between individual components.

Also, heating effects may contribute to dimming of the LED lighting over time, as well as reliability issues and possible premature failure of LED lighting fixtures. Conventional high-output LED lighting fixtures for hazardous location use include direct thermal couplings to heat sink devices, such as aluminum heat sinks, in order to reduce the peak operating temperature of the lighting fixture in use and to improve its life expectancy. Such heat sinks, however, tend to complicate the lighting fixture assembly at an undesirable economic cost.

As such, conventional high lumen LED luminaire assemblies are bulky, heavy, and difficult and expensive to manufacture in order for the luminaire assemblies to safely and reliably operate in a hazardous and/or harsh environment.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Figure 1A:
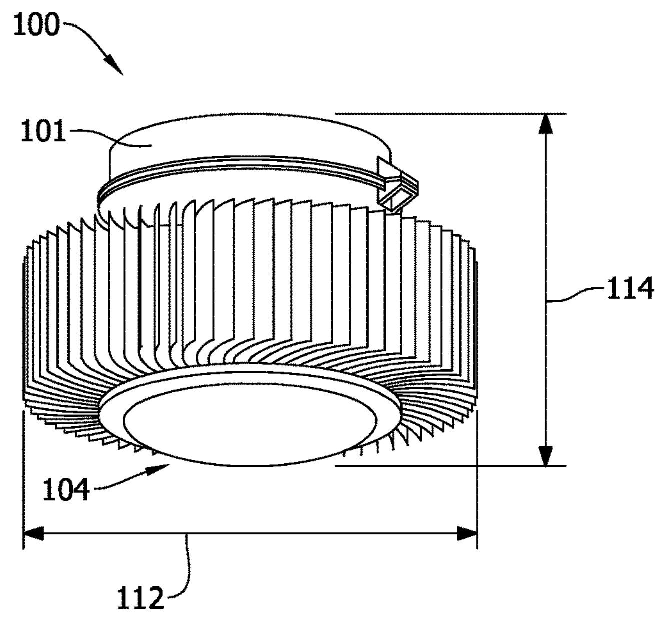
FIG. 1A (PRIOR ART)
FIG. 1A is a perspective view of a known luminaire assembly.

In order to understand the inventive concepts described herein to their fullest extent, some discussion of the state of the art and certain problems and disadvantages concerning LED light fixtures is set forth below, followed by exemplary embodiments of integrated luminaire assemblies overcoming such problems and disadvantages in the art.

Various types of lighting fixtures utilizing LEDs have been developed for numerous types of commercial and industrial environments. More specifically, LED light fixtures have been developed for lighting tasks in harsh and hazardous environments, such as being designed to be explosion-protected. Such lighting fixtures are constructed to be shock-resistant and vibration-resistant with no filament or glass to break, for immediate start with instant full illumination, no lifetime reduction due to switching cycles, and reduced disposal costs. Dealing with heat dissipation requirements or thermal management is a problem area for LED light fixtures. Heat dissipation is difficult in part because high luminance LED light fixtures typically have numerous LEDs operating at once in relatively small spacing from one another. Complex structures for LED module mounting and heat dissipation have, in many instances, been deemed necessary, and all of this adds complexity and cost to the fixtures.

Further, some known LED fixtures use heat sinks that are included into the fixture and engineered to provide a path for heat to travel and remove heat from the fixture to ensure a longer life, better lumen output and accurate color temperature. Many of these typical LED lighting fixtures in hazardous environments are high-luminance light fixtures and generate a large amount of heat in use. Dissipating heat for LED light fixtures is typically accomplished with heat sinks made of aluminum, and such heat sinks are included into the fixture typically equally adjacent from both LED assemblies and LED drivers to dissipate heat for all components. These aluminum heat sinks are costly for manufacturing the LED lighting fixtures. Typically these heat sinks are stacked in the fixture between the LED assemblies and the driver.

Luminaire assemblies that operate within hazardous environments present a risk of explosion via ignition of a surrounding gas or vapor dusts, fibers, or flyings. Such hazardous environments may arise, for example only, in petroleum refineries, petrochemical plants, grain silos, waste water and/or treatment facilities among other industrial facilities, wherein volatile conditions are produced in the ambient environment and present a heightened risk of fire or explosion. An occasional or continuous presence of airborne ignitable gas, ignitable vapors or ignitable dust, or otherwise flammable substances presents substantial concerns regarding safe and reliable operation of such facilities overall, including, but not limited to, safe operation of the lighting fixtures within predetermined temperature limits that, if exceeded, could produce ignition sources for possible fire or explosion. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Electrical equipment manufacturers may receive UL certification of compliance with the applicable rating standards for hazardous locations, and UL certification is an important aspect of a manufacturer's ability to successfully bring products to market in North America or any other market accepting of UL standard 1203.

The National Electric Code (NEC) generally classifies hazardous locations by class and division. Class 1 locations are those in which flammable vapors and gases may be present. Class II locations are those in which combustible dust may be found. Class III locations are those which are hazardous because of the presence of easily ignitable fibers or flyings. Considering Class 1, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Class I, Zone 0, 1, or 2 representing locations in which flammable gases or vapors are or may be airborne in an amount sufficient to produce explosive or ignitable mixtures. As defined in the IEC, a Class I, Zone 0 location is a location in which ignitable concentrations of flammable gases or vapors are present continuously or for long periods of time. A Class I, Zone 1 location is a location in which ignitable concentrations of flammable gases or vapors are likely to exist because of repair or maintenance operations or because of leakage or possible release of ignitable concentrations of flammable gases or vapors, or is a location that is adjacent to a Class I, Zone 0 location from which ignitable concentrations of vapors could be communicated.

While expressed a bit differently, IEC Zone 1 and NEC Division 2, in practice, generally converge to common locations in the assessment of hazardous environments. In view of modern environmental regulation and the concentrated nature of Division 1 and Zone 0 applications, any lighting fixtures installed in such hazardous locations must reliably operate at a safe temperature with respect to the surrounding atmosphere. As such, conventional LED lighting fixtures for hazardous locations include more extensive heat sink features for dissipating heat than other types of lighting fixtures, and the heat sinks may considerably complicate the lighting fixture assembly and also render the cost of hazardous location LED lighting fixtures undesirably high.

In addition to hazardous locations discussed above, so-called harsh locations also require specific focus in the design of light fixtures used therewith. Harsh locations may entail corrosive elements and the like in the atmosphere that are not necessarily explosive and/or are subject to temperature cycling, pressure cycling, shock and/or mechanical vibration forces that are typically not present in non-harsh operating environments. Of course, some locations in which LED lighting fixtures are desirably employed are both harsh and hazardous by nature, and are therefore heavy duty fixtures designed to withstand various operating conditions that typical lighting features for other uses could not withstand.

Simpler, more reliable, more cost-effective LED luminaire assemblies for harsh and/or hazardous environments, which are simpler and cheaper to manufacture, are therefore desired.

The assemblies and methods disclosed herein accordingly provide high lumen light-emitting diode (LED) luminaire assemblies including heavy duty materials meeting the requirements for specific types of harsh and/or hazardous environments. The LED luminaire assemblies disclosed herein include integrated mounting modules. Method aspects will be in part apparent and in part explicitly discussed in the following description.

Existing high lumen LED assemblies for harsh and hazardous location use are undesirably bulky in size and weight, undesirably difficult and expensive to manufacture and assembly, and provide limited thermal performance that provides a barrier to higher illumination devices in certain package sizes.

Figure 1B:
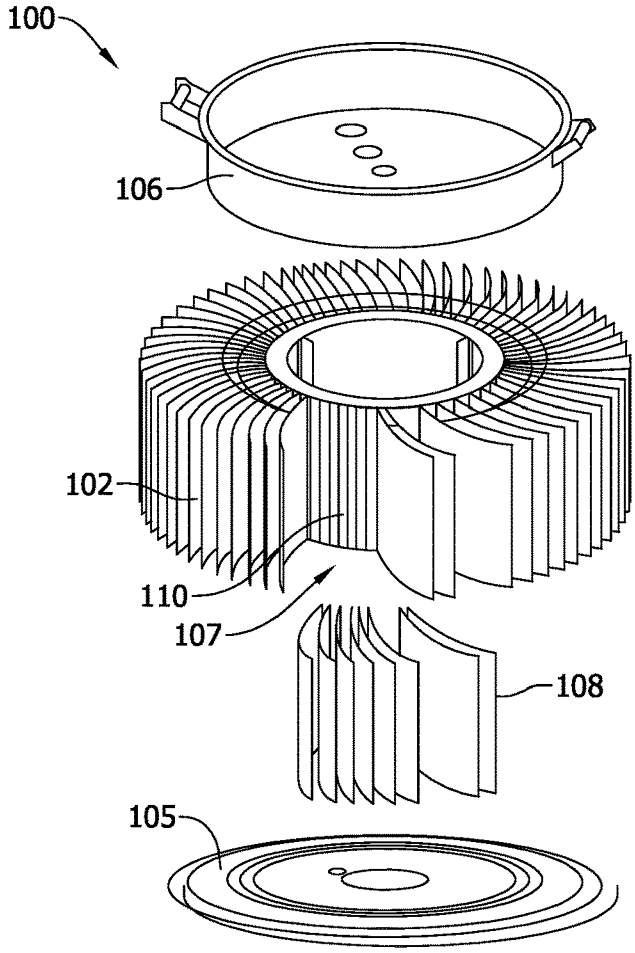
FIG. 1B (PRIOR ART)
FIG. 1B is an exploded view of part of the luminaire assembly shown in FIG. 1A.

FIG. 1A is a known high-lumen LED luminaire assembly 100. FIG. 1B is an exploded view of part of the luminaire assembly 100. The luminaire assembly 100 is configured to have a relatively high luminous flux, e.g., from approximately 13,000 lumens (lm) to approximately 25,000 lm, and is rated to be operated in a harsh and/or hazardous environment as discussed above. The luminaire assembly 100 is an LED luminaire assembly, and includes an LED assembly 104 having a plurality of LEDs (not shown). The luminaire assembly 100 includes a baseplate 105 on which the LED assembly 104 is mounted. The luminaire assembly 100 also includes a driver cover 101, a driver housing 106, and a heat sink assembly 102. The driver cover 101 and the driver housing 106 are used to house a driver (not shown), which provides electricity to drive the LEDs of the LED assembly 104. The heat sink assembly 102 includes a hub 107 and a plurality of fin assemblies 108. To assemble the heat sink assembly 102, the fin assemblies 108 are slid into slots 110 positioned on the exterior of the hub 107. The luminaire assembly 100 shown in FIG. 1 includes 57 individual pieces. Besides that all the individual pieces need to be assembled together, the luminaire assembly 100 is relatively bulky and heavy. For example, the luminaire assembly 100 has a width 112 of 38.1 centimeter (cm) (15 inches (in)), a height 114 of 32.36 cm (12.74 in), and a weight of 20 kilogram (kg) (44.57 pound (lbs.)).

During operation, the LED assembly 104 heats up quickly. For example, the LED assembly 104 may reach a temperature as high as 120° C., especially when the luminaire assembly 100 is operated in a hazardous environment, where the ambient temperature may be as high as 55° C. This temperature of the LED assembly 104 is much higher than an operation temperature limit of the drive, e.g., 80° C. If the driver and the LED assembly 104 are placed in proximity with each other, the driver would be overheated and would not function properly. As a result, a heat sink assembly 102 is placed between the driver and the LED assembly 104 to provide separation between the driver and the LED assembly 104 and also dissipate heat.

Figure 2A:
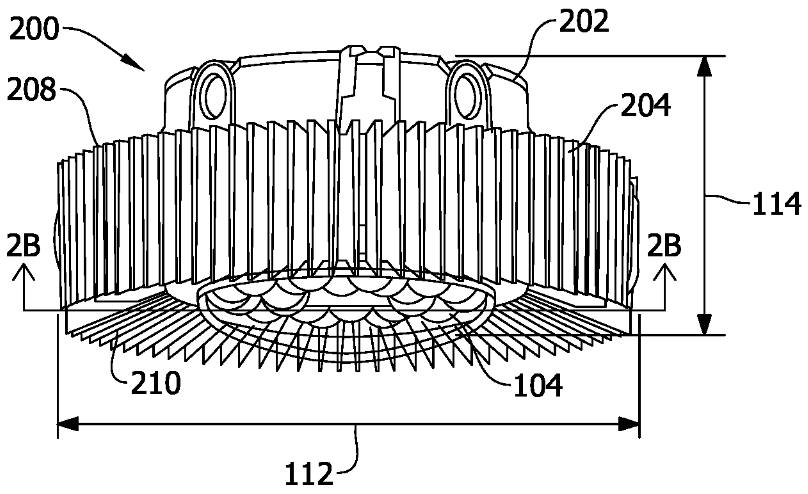
FIG. 2A shows a perspective view of an exemplary luminaire assembly.
Figure 2B:
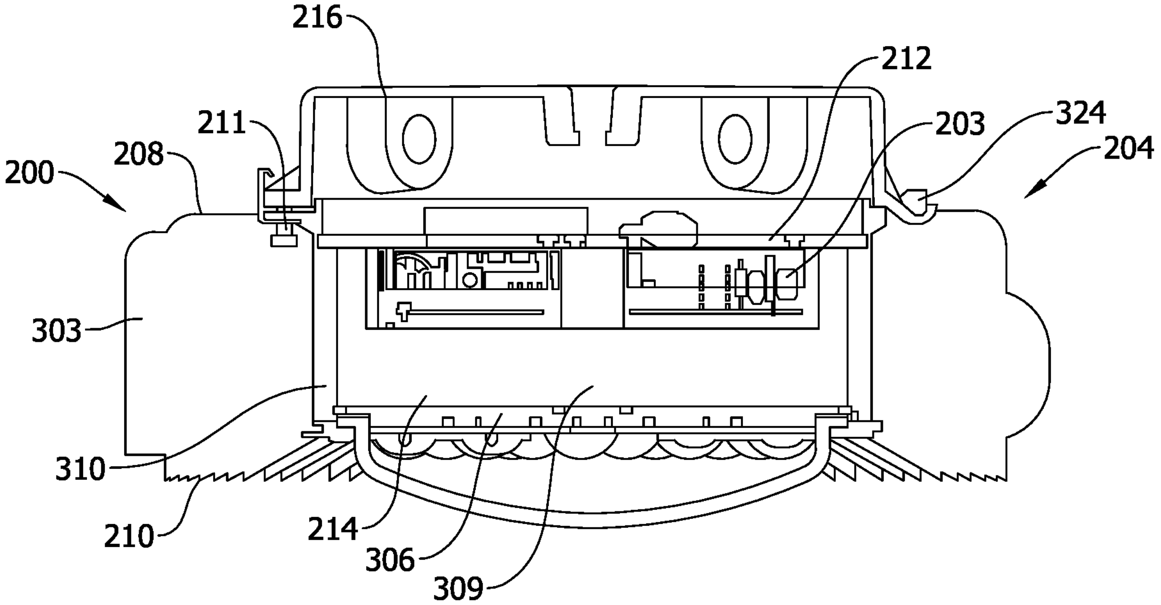
FIG. 2B is a cross-sectional view of the luminaire assembly shown in FIG. 2A along line 2B-2B in FIG. 2A.

FIGS. 2A and 2B show an exemplary luminaire assembly 200 specifically designed to meet the needs of a harsh and/or hazardous location. FIG. 2A is a prospective view of the luminaire assembly 200. FIG. 2B is a cross-sectional view of the luminaire assembly 200 along line 2B-2B in FIG. 2A. The luminaire assembly 200 is configured to have a high luminous flux, e.g., in a range from approximately 17,000 lm to approximately 25,000 lm, and is rated to operate in a harsh and/or hazardous environment as discussed above, where the luminaire assembly 200 is designed to safely and reliably operate in such an environment.

In the exemplary embodiment, the luminaire assembly 200 includes a driver cover 202, a mounting module 204, and an LED assembly 104. The driver cover 202 may be the same as the driver cover 101 shown in FIG. 1A. The driver cover 202 covers a driver 203, which is for driving and providing electricity to the LED assembly 104. The LED assembly 104 includes a plurality of LEDs for providing the desired luminous flux. The mounting module 204 is integrated and manufactured as one single piece, where the mounting module 204 integrates individual pieces of the known luminaire assembly 100, such as the driver housing 106, the heat sink assembly 102, and the baseplate 105 (FIG. 1B), into one single piece.

In operation, the driver cover 202 is mounted on a first side 208 of the mounting module 204, and the LED assembly 104 is mounted on a second side 210 opposite the first side 208 of the mounting module 204. Although the luminaire assemblies 100 and 200 have comparable luminous flux ratings, compared to the known luminaire assembly 100, the luminaire assembly 200 has a much reduced height and weight. For example, the luminaire assembly 200 shown in FIGS. 2A and 2B has a height 114 of 17.1 cm (7.73 in) and weight of 10.6 kg (23.4 lbs.), with a similar width 112 of 38.1 cm (16 in). The luminaire assembly 200 has a 50% reduction in weight and a 30% of reduction in height from the known luminaire assembly 100. Further, even with a much smaller height and weight and a comparable or higher luminous flux rating than the luminaire assembly 100, the luminaire assembly 200 meets thermal requirements for typical harsh and/or hazardous location use.

Further, because the mounting module 204 is manufactured as one single piece, the assembling of a luminaire assembly 200 is also simplified. The number of joints and components in the luminaire assembly 200 is also much reduced, providing a luminaire assembly 200 of increased rigidity and reliability and suited for a harsh and/or hazardous environment.

Figure 3A:
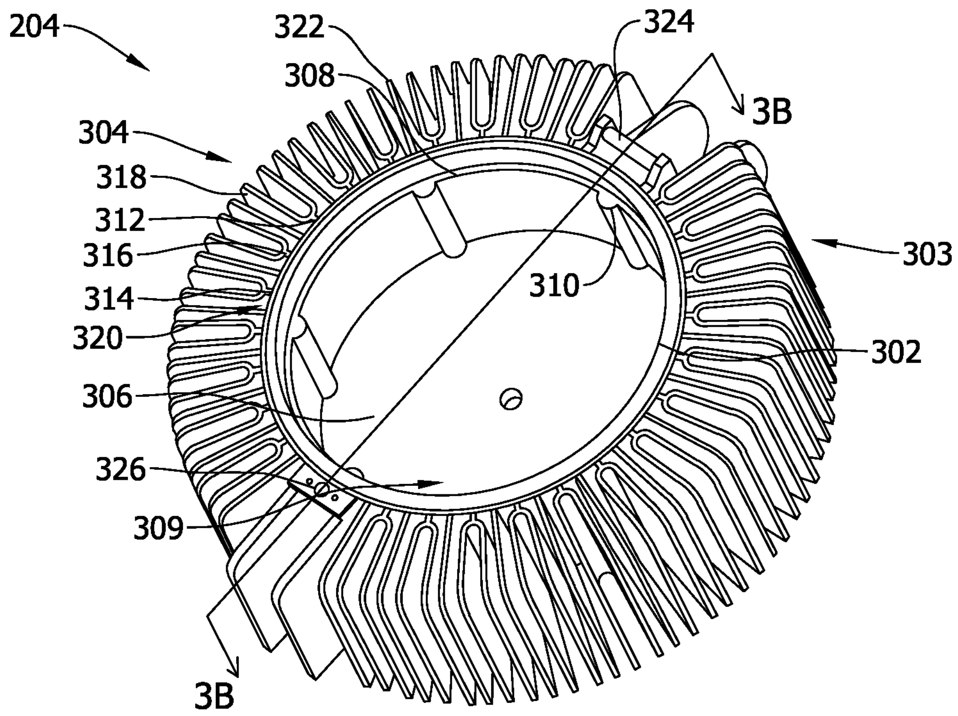
FIG. 3A is an exemplary mounting module of the luminaire assembly shown in FIG. 2A.
Figure 3B:
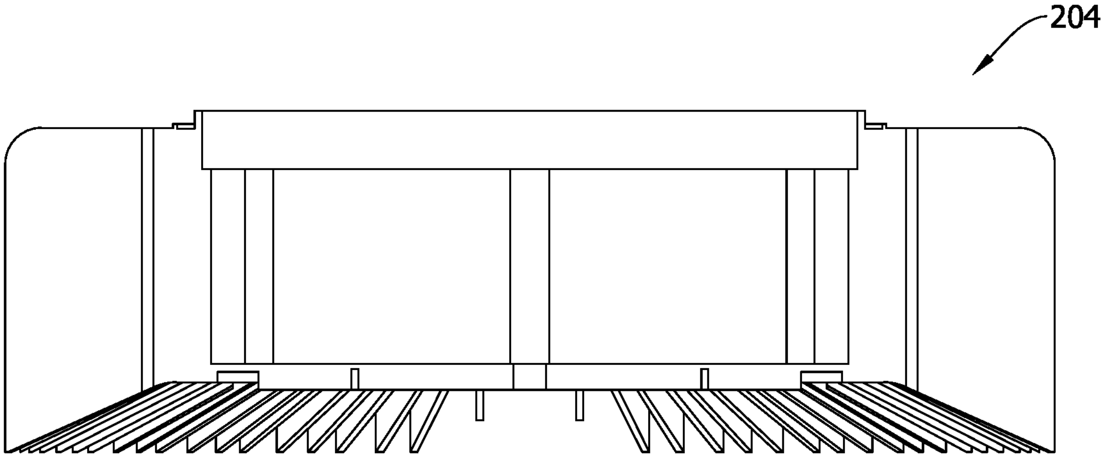
FIG. 3B is a cross-sectional view of the mounting module shown in FIG. 3A along line 3B-3B in FIG. 3A.

FIGS. 3A-3B show the mounting module 204 of the luminaire assembly 200. FIG. 3A is a top perspective view of the mounting module 204. FIG. 3B is a cross-sectional view of the mounting module 204 along line 3B-3B in FIG. 3A. In the exemplary embodiment, the mounting module 204 includes a hub 302 and a heat sink assembly 303.

In the depicted embodiment, the hub 302 includes a baseplate 306 and a wall 308. The wall 308 extends from the baseplate 306. The baseplate 306 may be circular, or in other shapes such as elliptical or rectangular that allows the hub 302 to function as described herein. The baseplate 306 and the wall 308 define a cavity 309. The hub 302 further includes one or more pillars 310 that extend from the interior of the wall 308. The pillars 310 may extend along the wall 308 in the height direction of the wall 308.

In the exemplary embodiment, the heat sink assembly 303 includes a plurality of fin assemblies 304. Each fin assembly 304 includes a fin base 312 that has a first end 314 and a second end 316 opposite the first end 314. The fin base 312 extends radially from the hub 302 at the first end 314 of the fin base 312. The fin base 312 may extend from an exterior of the wall 308. The fin assembly 304 may further include a plurality of fins 318 extending radially from the fin base 312 at the second end 316 of the fin base 312. In this configuration, the fins 318 do not crowd the hub 302 at the fin base 312 and dissipation pockets 320 are formed by the fin base 312 and the hub 302. Heat from the hub is dissipated to air through the dissipation pockets 320, as well as being directed further away from the hub 302 through the fin base 312 and the fins 318. The configuration that multiple fins 318 extend from one fin base 312 further increases heat dissipation area through multiple fins 318. The heat sink assembly 303 may further comprise one or more fin assembly separators 322 that separate the fin assemblies 304. The fin assembly separators 322 direct heat away from the hub 302 and increase areas for heat dissipation.

In some embodiments, the mounting module 204 further includes a hinge 324 positioned on the hub 302 and one or more holes 326 to receive fasteners 211 (FIG. 2B) like screws. A driver cover 216 (FIG. 2B) is coupled to the mounting module 204 by coupling the driver cover 216 to the hinge 324 and fastening fasteners 211 into holes 326. The hinge 324, fasteners 211, and holes 326 are an exemplary coupling mechanism between the driver cover 216 and the mounting module 204. Other coupling mechanisms that allow the luminaire assembly 200 to function as described herein may also be used.

The mounting module 204 may be fabricated by casting. The mounting module 204 may be fabricated by other manufacturing processes such as additive manufacturing. The mounting module 204 may be composed of aluminum, such as AL 8360, or may be composed of other thermally-conductive material that allows the mounting module 204 to function as described herein.

In operation, the single-piece mounting module 204 is used to mount the LED assembly 104 and the driver 203, and also dissipates heat away from the LED assembly 104 and the driver 203 through the heat sink assembly 303 of the mounting module 204.

Figure 4A:
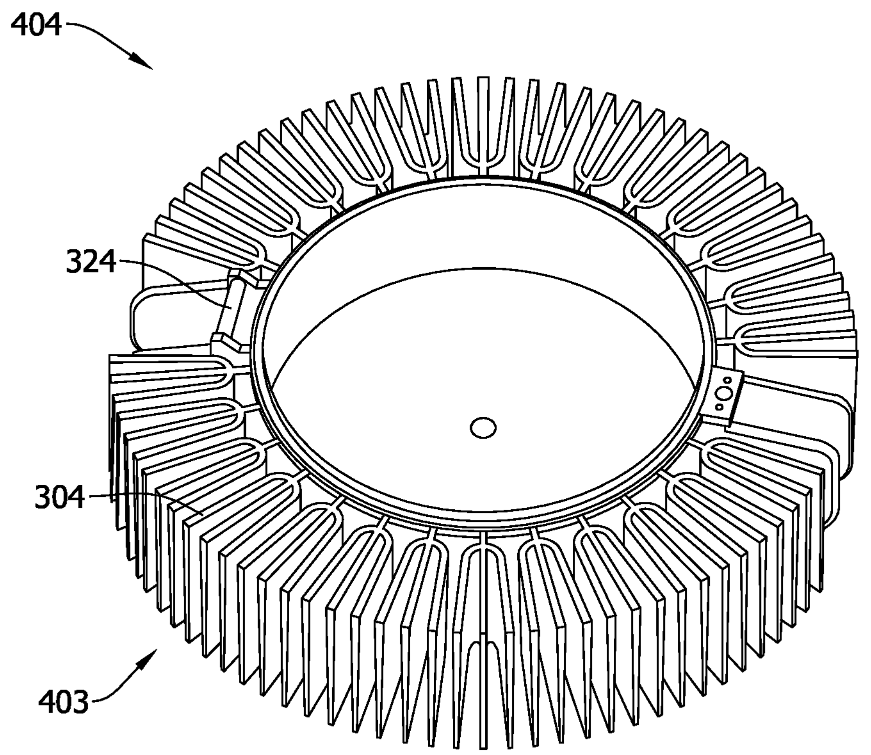
FIG. 4A is a perspective view of another embodiment of an exemplary mounting module of the luminaire assembly shown in FIG. 2A.
Figure 4B:
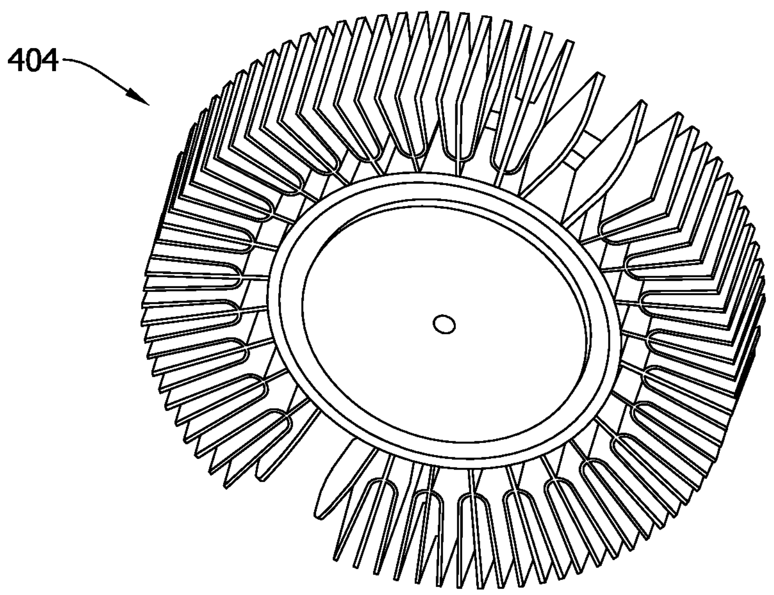
FIG. 4B is a bottom perspective view of the mounting module shown in FIG. 4A.
Figure 4C:
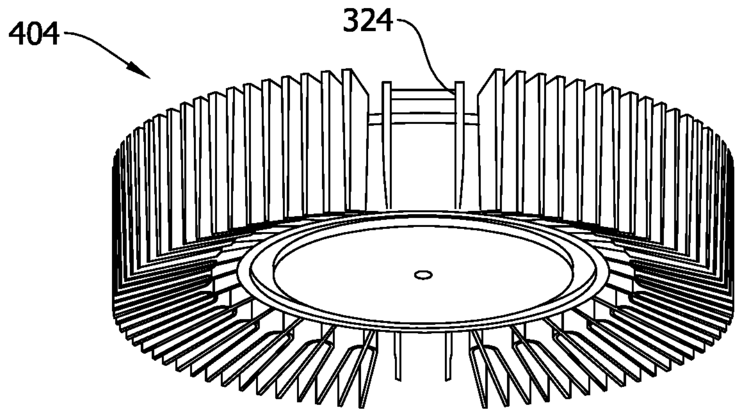
FIG. 4C is another bottom perspective view of the mounting module shown in FIG. 4A when viewed from a hinge of the mounting module.

FIGS. 4A-4C show another embodiment of the mounting module 404. FIG. 4A is a top perspective view of the mounting module 404. FIG. 4B is a bottom view of the mounting module 404. FIG. 4C is another bottom view of the mounting module 404 viewed from the hinge 324. Compared to the mounting module shown in FIGS. 3A and 3B, the heat sink assembly 403 of the mounting module 404 does not include fin assembly separators 322 between fin assemblies 304.

Figure 5A:
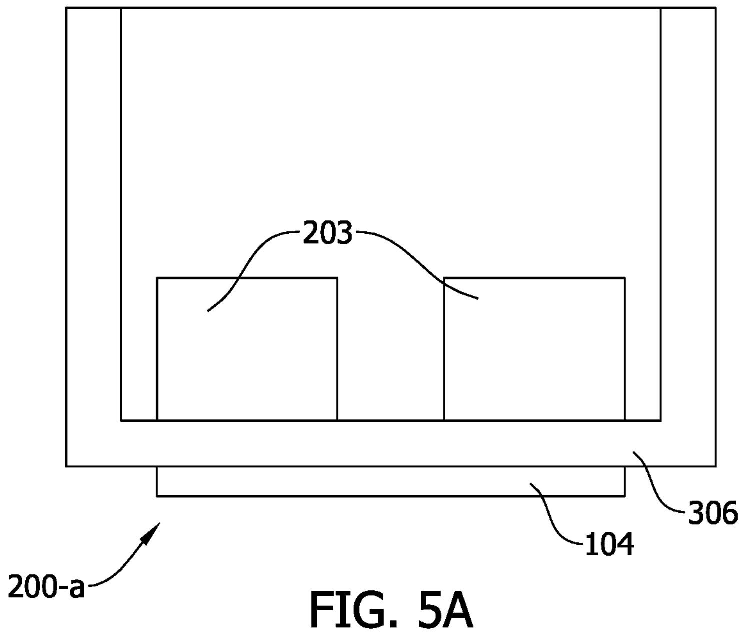
FIG. 5A is schematic diagram of an exemplary luminaire assembly.
Figure 5B:
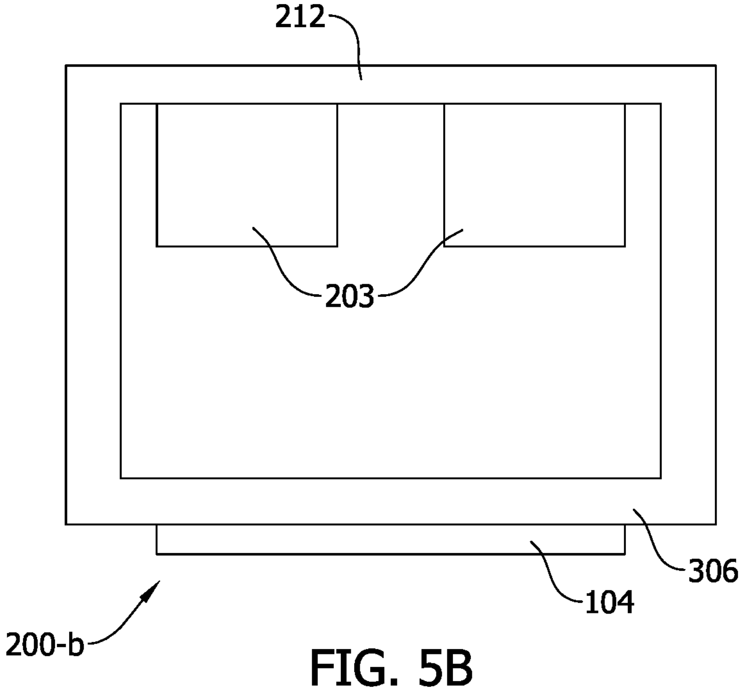
FIG. 5B is a schematic diagram of another exemplary luminaire assembly.
Figure 5C:
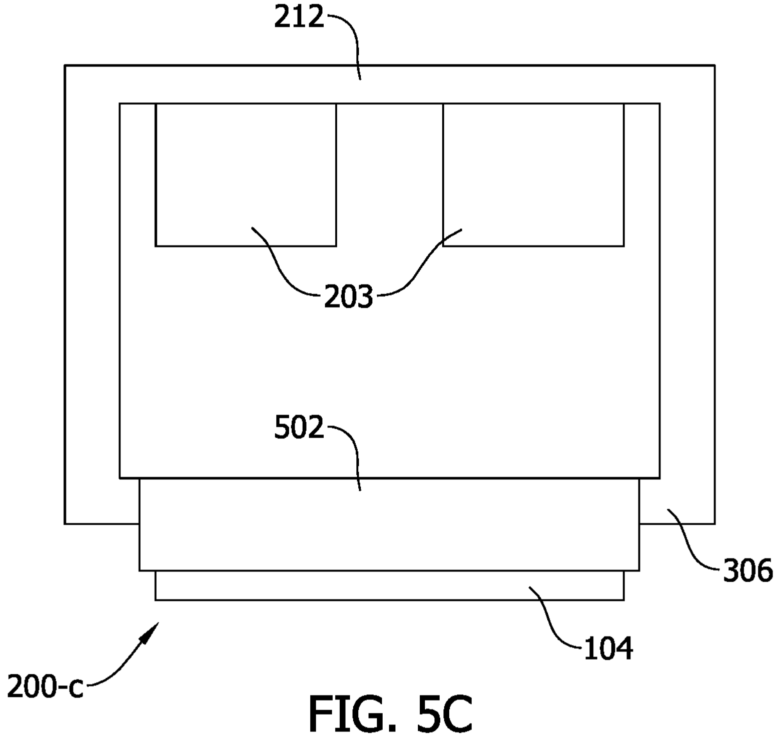
FIG. 5C is a schematic diagram of one more exemplary luminaire assembly.

FIGS. 5A-5C are schematic diagrams of luminaire assemblies 200-*a*, 200-*b*, and 200-*c*. In the luminaire assembly 200-*a*, the drivers 203 are mounted on the baseplate 306 while the LED assembly 104 is mounted on the opposite side of the baseplate 306. In the luminaire assemblies 200-*b*, 200-*c*, the drivers 203 are mounted on a driver plate 212. By mounting the drivers 203 onto the driver plate 212, instead of onto the baseplate 306, the temperatures of the drivers 203 are reduced for the luminaire assemblies 200-*b*, 200-*c*, for example, by 5° C. in some embodiments, relative to the luminaire assembly 200-*a*. Different from the luminaire assembly 200-*b* shown in FIG. 5B, the baseplate 306 of the luminaire assembly 200-*c* shown in FIG. 5C includes a projected portion 502, onto which the LED assembly 104 is mounted. Compared to the luminaire assembly 200-*b*, the temperatures of the drivers 203 of the luminaire assembly 200-*c* shown in FIG. 5C are further reduced, for example, by 2° C. in some embodiments. Two drivers 203 are shown included in the luminaire assemblies 200*a*, 200-*b*, and 200-*c* as an example only. Other numbers of drivers 203 may be included in a luminaire assembly 200, depending on the size of the driver 203 and the power needed to drive the LED assembly 104.

Figure 6A:
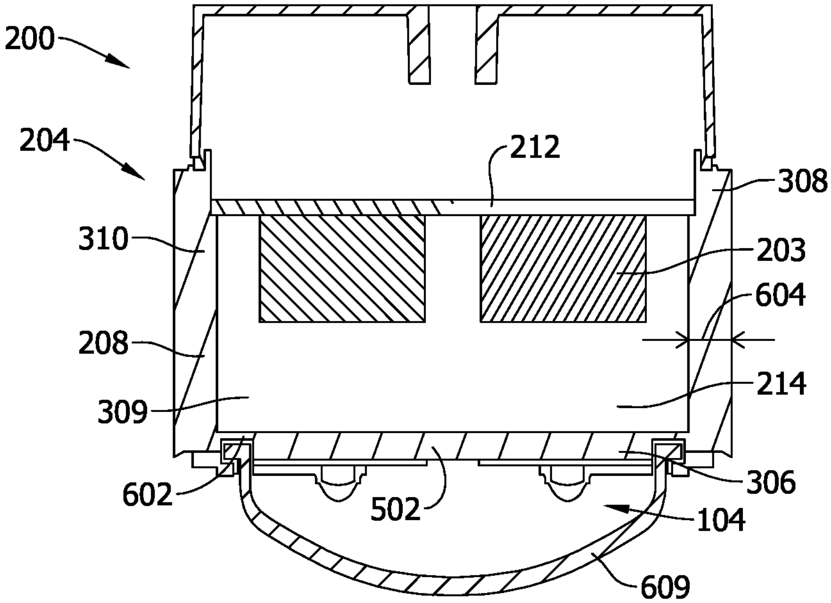
FIG. 6A is a schematic diagram of a sectional view of the luminaire assembly shown in FIG. 2A along line 2B-2B.
Figure 6B:
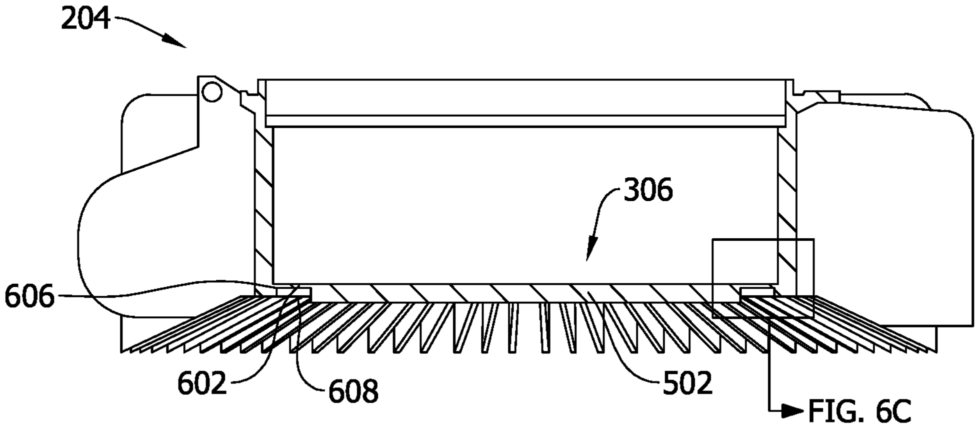
FIG. 6B is a mounting module of the luminaire assembly shown in FIG. 6A.
Figure 6C:
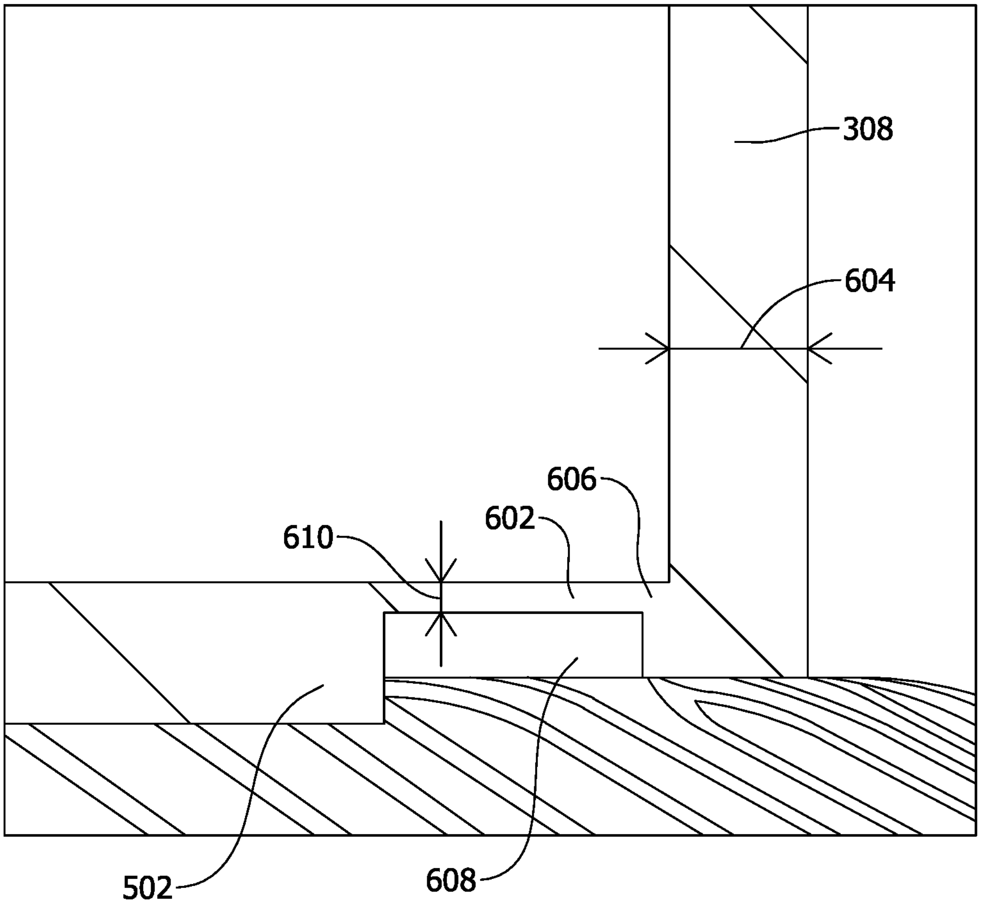
FIG. 6C is an enlarged view of a portion of the mounting module.

Similar to FIG. 2B, FIG. 6A is also a cross-sectional view of the luminaire assembly 200 along line 2B-2B in FIG. 2A. Different from FIG. 2B, FIG. 6A is a schematic diagram. FIG. 6B is a cross-sectional view of the mounting module 204 of the luminaire assembly 200 by itself. FIG. 6C is an enlarged view of a bridge section 602 of the baseplate 306.

In the exemplary embodiment, the luminaire assembly 200 further includes the driver plate 212 (FIGS. 2B and 6A). The driver plate 212 is mounted on the mounting module 204 at the first side 208 of the mounting module 204. In one embodiment, the driver plate 212 covers or at least partially covers the cavity 309 when the driver plate 212 is mounted on the mounting module 204. The driver plate 212 may be mounted on the mounting module 204 by being coupled to the pillars 310, for example, with fasteners like screws being inserted into and coupled to the pillars 310. The driver 203 may be mounted on the driver plate 212. A direct thermal link between the driver 203 and the LED assembly 104 is limited to the pillars 310. In some embodiments, the driver 203 is positioned in the cavity 309. As such, the height of the luminaire assembly 200 is reduced. Further, a separation 214 between the driver 203 and the baseplate 306 provides a thermal separation between the driver 203 and the LED assembly 104. In addition, the heat sink assembly 303 further dissipates heat away from the driver 203 and the LED assembly 104. Therefore, the driver 203 and LED assembly 104 operate at different temperatures. In some embodiments, to further reduce the temperatures of the drivers 203, the thickness 604 of the wall 308 is increased to facilitate an increased heat dissipation.

In the depicted embodiment, the baseplate 306 of the mounting module 204 includes the projected portion 502, onto which the LED assembly 104 is mounted. The baseplate 306 may further include the bridge section 602 between the projected portion 502 and the remaining section 606 of the baseplate 306. The bridge section 602 has a reduced thickness 610 than the projected portion 502 and the thickness of the remaining section 606, and form a groove 608 for installing a lens 609 for the LED assembly. The lens 609 is made of thermally-nonconductive material, such as glass. The reduced thickness 610 of the bridge section 602 reduces heat transferred from the LED assembly 104 through the heat sink assembly 303 to the drivers 203, thereby further reducing the temperatures of the drivers 203. The ratio between the thickness 610 of the bridge section 602 and the thickness 604 of the wall 308 may be adjusted to achieve desired temperature reduction in the drivers 203. In some embodiments, the ratio is 0.3 to 0.8, achieving a temperature reduction in the drivers 203 of approximately 2° C.

Figure 7:
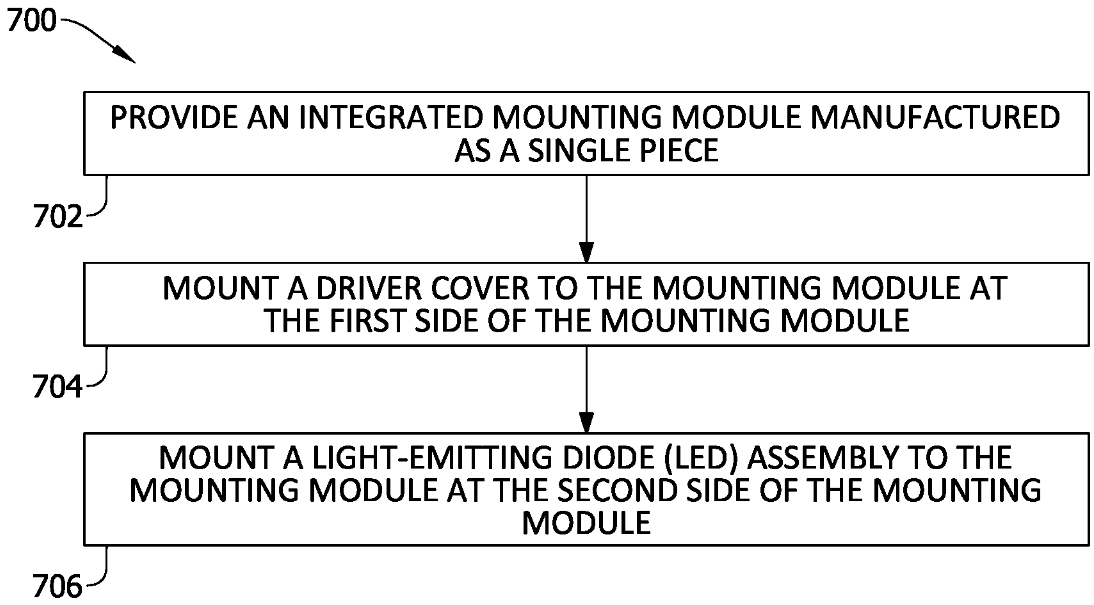
FIG. 7 is a flow chart of an exemplary method of fabricating the luminaire assembly shown in FIGS. 2A-6C.

FIG. 7 is a flowchart of an exemplary method 700 of fabricating a luminaire assembly. The method 700 includes providing 702 an integrated mounting module manufactured as a single piece and including a first side and a second side opposite the first side. The method 700 further includes mounting 704 a driver cover to the mounting module at the first side of the mounting module. The method 700 also includes mounting 706 an LED assembly to the mounting module at the second side of the mounting module.

The high lumen LED luminaire assemblies described above for harsh and hazardous location use are significantly smaller and lighter and more reliable than conventional assemblies offering comparable illumination, may be manufactured and assembled at significantly lower cost, and provide improved thermal performance that facilitates higher illumination devices in smaller package sizes.

At least one technical effect of the systems and methods described herein includes (a) a single-piece mounting module for a driver and an LED assembly; (b) separation between the driver and the LED assembly, allowing the driver and the LED assembly to operate at different temperatures; (c) a baseplate including a projected section and/or a bridge section of a reduced thickness to reduce heat transferred from the LED assembly to the mounting module; (d) a single piece mounting module including a heat sink assembly, and (e) an improved heat sink assembly of the mounting module.

The benefits and advantages of the inventive concepts are now believed to have been amply illustrated in relation to the exemplary embodiments disclosed.

An embodiment of a high-lumen LED luminaire assembly for a harsh and hazardous environment is disclosed. The luminaire assembly includes an integrated mounting module manufactured as a single piece and including a first side and a second side opposite the first side. The luminaire assembly also includes an LED assembly coupled to the mounting module at the second side of the mounting module, and a driver configured to provide electricity to the LED assembly. The luminaire assembly further includes a driver cover sized to cover the driver and coupled to the mounting module at the first side of the mounting module. The driver and the LED assembly are operable within a target peak temperature limit for the hazardous environment.

Optionally, the luminaire assembly further includes a plate mounted on the mounting module, wherein the driver is mounted on the plate. The mounting module forms a cavity, and the plate at least partially covers the cavity. The mounting module further includes a hub and a heat sink assembly including a plurality of fin assemblies extending radially outwards from the hub. The heat sink assembly further includes a plurality of fin assembly separators extending from the hub and positioned between the plurality of fin assemblies. Each of the fin assemblies includes a plurality of fins and a fin base having a first end and a second end opposite the first end, the fin base extending radially from the hub at the first end of the fin base, and the plurality of fins branching and extending radially from the fin base at the second end of the fin base. The mounting module further includes a hub having a baseplate, the baseplate including a projected section having a thickness greater than a remaining section of the baseplate, and the LED assembly is mounted onto the projected section. The baseplate further includes a bridge section having a thickness smaller than the thickness of the projected section and a thickness of the remaining section, the bridge section connecting the projected section with the remaining section and forming a groove sized to receive a lens for the LED assembly. The hub further includes a wall coupled to the baseplate, and a ratio of the thickness of the bridge section and a thickness of the wall is in a range of from 0.3 to 0.8.

An embodiment of an integrated mounting module for fabricating a high-lumen LED luminaire assembly for a harsh and hazardous environment is disclosed. The mounting module includes a hub forming a cavity and a heat sink assembly including a plurality of fin assemblies extending radially from the hub, wherein the mounting module is manufactured as one single piece.

Optionally, the mounting module includes a first side and a second side opposite the first side, wherein the mounting module is configured to couple to a driver cover at a first side and is configured to couple to an LED assembly at the second side. The mounting module further includes a plurality of pillars configured to couple to a plate to at least partially cover the cavity. The heat sink assembly further includes a plurality of fin assembly separators extending from the hub and positioned between the plurality of fin assemblies. Each of the fin assemblies includes a plurality of fins and a fin base having a first end and a second end opposite the first end, the fin base extending radially from the hub at the first end of the fin base, and the plurality of fins branching and extending radially from the fin base at the second end of the fin base. The hub further includes a baseplate, the baseplate including a projected section having a thickness greater than a thickness of a remaining section of the baseplate. The baseplate further includes a bridge section having a thickness smaller than the thickness of the projected section and a thickness of the remaining section, the bridge section connecting the projected section with the remaining section and forming a groove sized to receive a lens for an LED assembly. The hub further includes a wall coupled to the baseplate, and a ratio of the thickness of the bridge section and a thickness of the wall is in a range of from 0.3 to 0.8.

An embodiment of a method of fabricating a high-lumen LED luminaire assembly for a harsh and hazardous environment is disclosed. The method includes providing an integrated mounting module manufactured as a single piece and including a first side and a second side opposite the first side, mounting a driver cover to the mounting module at the first side, and mounting an LED assembly to the mounting module at the second side. The driver and the LED assembly are operable within a target peak temperature limit for the hazardous environment.

Optionally, the method further includes mounting a driver on a plate, wherein the driver is configured to provide electricity to the LED assembly; and mounting the plate on the mounting module. The mounting module includes a baseplate, the baseplate includes a projected section, a remaining section, and a bridge section connecting the projected section and the remaining section. The projected section having a thickness greater than a thickness of the bridge section and a thickness of the remaining section, the thickness of the bridge section being smaller than the thickness of the projected section and the thickness of the remaining section, the bridge section forming a groove sized to receive a lens for the LED assembly. The method further includes mounting the lens onto the mounting module at the groove.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments, certain components in the assemblies described may be omitted to accommodate particular types of fuses or the needs of particular installations, while still providing the needed performance and functionality of the fuses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A light-emitting diode (LED) luminaire assembly, comprising:

a mounting module comprising a first side and a second side opposite the first side;

an LED assembly mounted on a baseplate mechanically coupled to the mounting module at the second side of the mounting module; and a driver mounted on a driver plate and configured to provide electricity to the LED assembly, wherein the driver plate is mechanically coupled to the mounting module at the first side, and further wherein the driver plate is thermally coupled to the mounting module to dissipate heat to the mounting module;

wherein the baseplate includes one or more reduced thickness sections along a path of thermal conduction between the LED assembly and the mounting module to decrease conductive heat transfer between the LED assembly and the driver, wherein the mounting module, the baseplate, and the driver plate define a cavity configured to provide thermal separation between the driver and the LED assembly.

2. The luminaire assembly of claim 1, wherein the mounting module further comprises a hub and a heat sink assembly comprising a plurality of fin assemblies extending radially outwards from the hub.

3. The luminaire assembly of claim 2, wherein the heat sink assembly further comprises a plurality of fin assembly separators extending from the hub and positioned between the plurality of fin assemblies.

4. The luminaire assembly of claim 2, wherein each of the plurality of fin assemblies comprises a plurality of fins and a fin base, the fin base having a first end and a second end opposite the first end, the fin base extending radially from the hub at the first end of the fin base.

5. The luminaire assembly of claim 4, wherein the plurality of fins branch and extend radially from the fin base at the second end of the fin base.

6. The luminaire assembly of claim 1, wherein the mounting module further includes a hub having the baseplate, wherein the baseplate includes a projected section having a thickness greater than a remaining section of the baseplate, and wherein the LED assembly is mounted onto the projected section.

7. The luminaire assembly of claim 6, wherein the baseplate further includes a bridge section, a thickness of the bridge section being smaller than the thickness of the projected section and the thickness of the remaining section, the bridge section connecting the projected section with the remaining section.

8. The luminaire assembly of claim 7, wherein the hub further includes a wall coupled to the baseplate, and a ratio of the thickness of the bridge section and a thickness of the wall is in a range between 0.3 and 0.8.

9. The luminaire assembly of claim 7, wherein the LED assembly comprises a lens, and the bridge section comprises a groove configured to receive the lens.

10. A mounting module for a light-emitting diode (LED) luminaire assembly, comprising:

a hub forming a cavity, wherein the hub further comprises a baseplate, the baseplate further including a bridge section connecting a projected section with a remaining section, wherein the bridge section with a reduced thickness is disposed along a path of thermal conduction between the projected section and the remaining section; and a heat sink assembly comprising a plurality of fin assemblies extending radially from the hub, wherein the bridge section facilitates decreased conductive heat transfer between an LED assembly coupled to the mounting module and a driver of the LED assembly mounted on a driver plate, wherein the mounting module is thermally coupled to the driver and configured to dissipate heat received from the driver, and wherein the mounting module, the baseplate, and the driver plate define the cavity configured to provide thermal separation between the driver and the LED assembly.

11. The mounting module of claim 10, the mounting module further comprising a first side and a second side opposite the first side, wherein the mounting module is configured to couple to a driver cover at the first side, and wherein the mounting module is configured to couple to the LED assembly at the second side.

12. The mounting module of claim 10, wherein the mounting module further comprises a plurality of pillars configured to couple to the driver plate to at least partially cover the cavity.

13. The mounting module of claim 10, wherein the heat sink assembly further comprises a plurality of fin assembly separators extending from the hub and positioned between the plurality of fin assemblies.

14. The mounting module of claim 10, wherein each of the plurality of fin assemblies comprises a plurality of fins and a fin base having a first end and a second end opposite the first end, the fin base extending radially from the hub at the first end of the fin base, and the plurality of fins branching and extending radially from the fin base at the second end of the fin base.

15. The mounting module of claim 10, wherein the bridge section has a thickness smaller than a thickness of the projected section and a thickness of the remaining section.

16. The mounting module of claim 10, wherein the hub further includes a wall coupled to the baseplate, and a ratio of a thickness of the bridge section and a thickness of the wall is in a range between 0.3 and 0.8.

17. The mounting module of claim 15, wherein the bridge section connecting the projected section with the remaining section comprises a groove configured to receive a lens for the LED assembly.

18. A method of fabricating a light-emitting diode (LED) luminaire assembly, comprising:

providing a mounting module, wherein the mounting module forms a cavity;

mounting a baseplate on the mounting module;

mounting an LED assembly on the baseplate;

wherein the baseplate includes one or more reduced thickness sections along a path of thermal conduction between the mounting module and the LED assembly;

mounting a driver plate on the mounting module; and mounting a driver on the driver plate, wherein the driver is configured to provide electricity to the LED assembly, wherein the driver plate is mechanically and thermally coupled to the mounting module to dissipate heat to the mounting module, wherein the one or more reduced thickness sections facilitate decreased conductive heat transfer between the LED assembly and the mounting module so that the driver and the LED assembly are operable within a target peak temperature limit, and wherein the mounting module, the baseplate, and the driver plate define the cavity configured to provide thermal separation between the driver and the LED assembly.

19. The method of claim 18, wherein the baseplate includes a projected section, a remaining section, and a bridge section connecting the projected section and the remaining section, a thickness of the bridge section being smaller than a thickness of the projected section and a thickness of the remaining section.

20. The method of claim 19, the bridge section further comprising a groove sized to receive a lens for the LED assembly, the method further comprising mounting the lens onto the mounting module at the groove.

* * * * *